United States Patent [19]
Stead et al.

[11] 3,974,860
[45] Aug. 17, 1976

[54] VALVE

[75] Inventors: Michael Stead, Wakefield; Gordon Heap, Leeds, both of England

[73] Assignee: Batley Controls Limited, Great Britain

[22] Filed: Sept. 18, 1974

[21] Appl. No.: 507,137

[30] Foreign Application Priority Data
Sept. 26, 1973 United Kingdom............... 45085/73

[52] U.S. Cl......................... 137/625.3; 137/625.32; 251/208

[51] Int. Cl.²........................................ F16K 47/04

[58] Field of Search............... 251/208; 137/625.28, 137/625.30, 625.31, 625.32

[56] References Cited
UNITED STATES PATENTS
3,234,966  2/1966  Klose ............................. 137/625.3
3,677,297  7/1972  Walton .......................... 137/625.28

FOREIGN PATENTS OR APPLICATIONS
1,367,924  6/1974  France ........................... 137/625.31

*Primary Examiner*—Arnold Rosenthal
*Attorney, Agent, or Firm*—Stevens, Davis, Miller & Mosher

[57] ABSTRACT

A vane for a flow control valve comprises a disc-shaped member mountable for rotation about an axis through the plane of the member. Integral with the disc-shaped member is at least one flow-modifying member provided with openings therethrough so that, in the open position of the vane all of the fluid flow takes place through the openings. The shape and size of the openings determines the flow characteristics in a particular system.

9 Claims, 7 Drawing Figures

VALVE

This invention relates to valves for controlling fluid flow.

According to the present invention there is provided a vane for a flow control valve comprising a substantially disc-shaped member adapted for mounting for rotation about an axis in or parallel to the plane of and passing through or near to the center of the disc-shaped member, and, attached to and extending out of the plane of the disc-shaped member, at least one flow modifying member having one or more openings therethrough, the arrangement being such that, when the valve vane is in use and in an open position, the whole of the fluid flow must take place through one or more openings in the or each flow modifying member.

Preferably, the or each flow modifying member is integral with the disc-shaped member and depends from a peripheral portion of the disc-shaped member radially inwardly so as to extend to or beyond a perpendicular axis through the center of the disc-shaped member. More preferably, the or each flow modifying member depends from a semi-circular portion of the periphery of the disc-shaped member and is substantially in the form of a quarter of a spherical shell, the quarter shell being provide with one or more cut-out portions. In this case the valve vane is preferably provided with two such flow modifying members extending in opposite directions from opposed semi-circular portions of the disc-shaped member.

The invention also provides a flow control valve comprising a valve vane of the invention mounted by, for instance, trunnion bearings in a valve may body. The valve also be provided with a valve actuator which may, for instance, be of the diaphragm or piston type.

By variations of the shape and size of the openings in the flow control member it is possible to obtain a wide variety of flow characteristics in a flow system, such as a pipeline, in which the valve of the invention is incorporated. Additionally, the valve may be of benefit in reducing noise in a system, in which case it may serve a flow-control function and/or a noise reducing function.

It will be appreciated from the above statements that the valve vane of the invention acts, in use, as a sort of rotatably variable diffuser.

An embodiment of the invention will now be described, by way of example only, and with reference to the accompanying drawings, in which.

Figure 1:
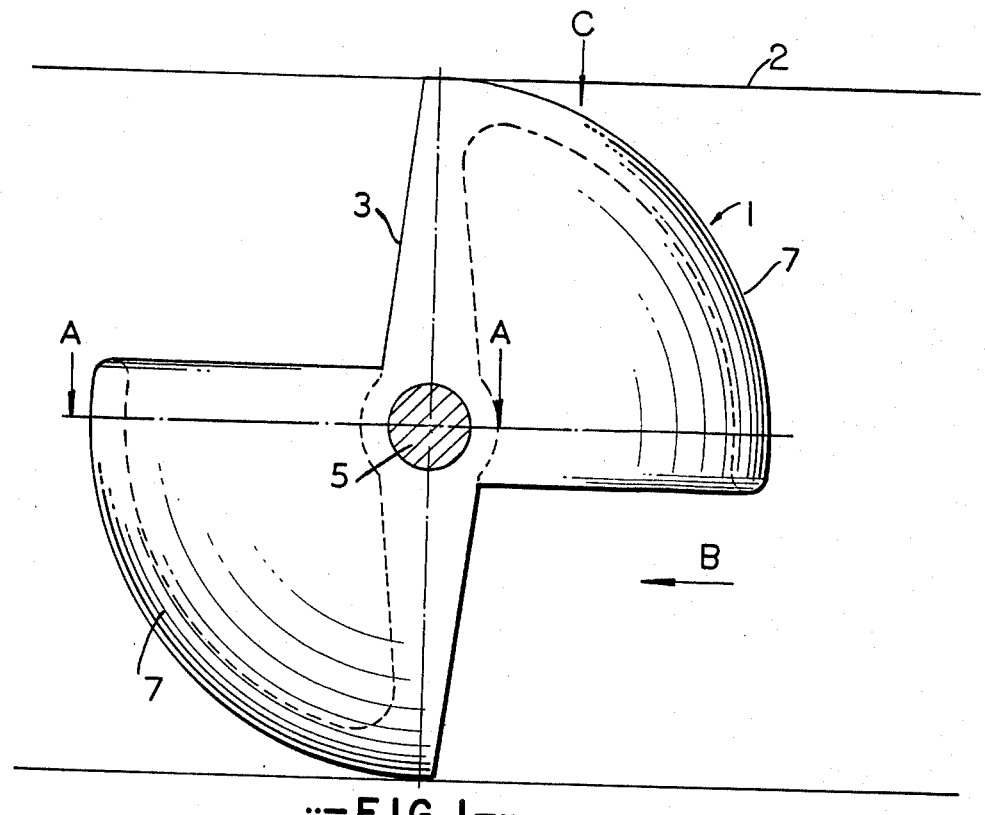
FIG. 1 is a cross-section through a valve vane of the invention.
Figure 2:
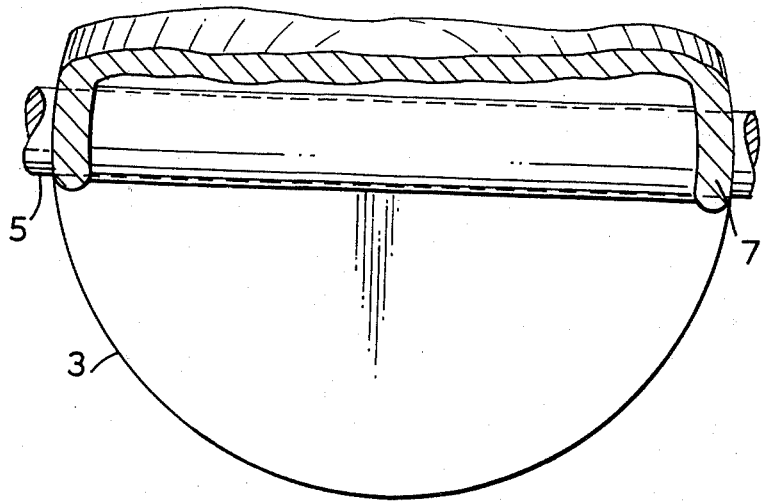
FIG. 2 is a section through a part of the valve vane of FIG. 1 in a direction B.
Figure 3:
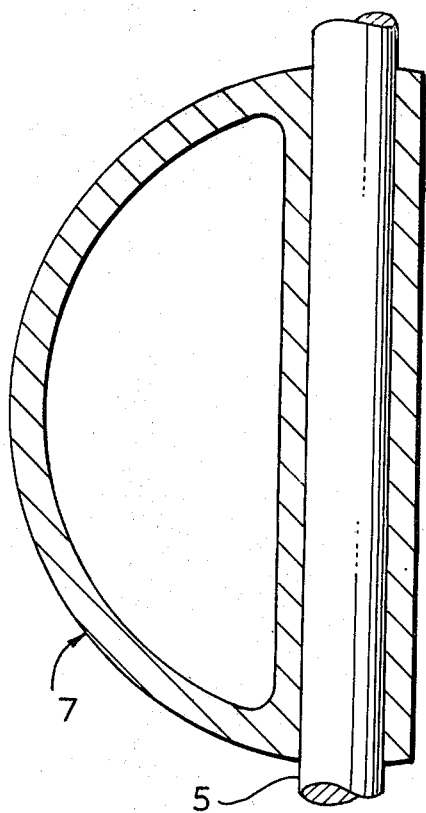
FIG. 3 is a section on the line A—A of the valve vane shown in FIG. 1.

As shown in the drawings a valve vane 1 comprises a substantially disc-shaped member 3 mounted on valve pin 5 for rotation about an axis in the plane of and passing through the center of disc-shaped member 3. Integral with disc-shaped member 3 and depending from a semi-circular portion thereof are two flow modifying members 7, each member 7 being in the form of a quarter of a spherical shell. The two members 7 depend in opposite directions from semi-circular portions of disc-shaped member 3 so as to extend slightly beyond the perpendicular axis through the center of disc-shaped member 3.

Figure 5:
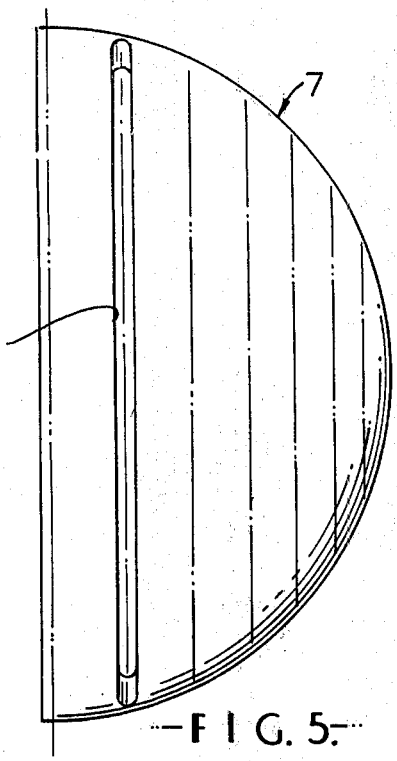
Figure 6:
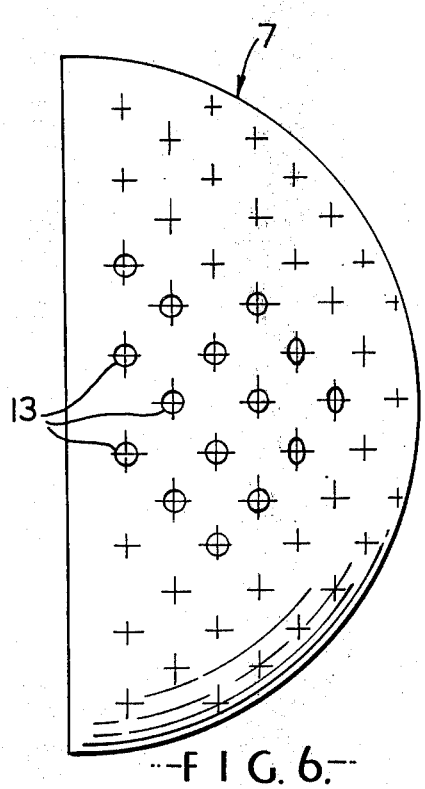

Each flow modifying member 7 has one or more cut-out portions which may be in the form of slots 9 or 11 (FIGS. 4 and 5) or in the form of small holes 13 (FIG. 6). In use, the valve vane 1 may be mounted in trunnion bearings in a valve body 2 incorporated in a flow system such as a pipeline. A valve actuator of, for instance, a diaphragm or piston type is connected to the valve so as to rotate the vane 1 through the valve pin 5.

If the direction of flow is perpendicular to the plane of the disc-shaped member 3 as seen in FIG. 1 then the valve is in its closed position and no flow will take place. On rotation of the valve vane 1 in a clockwise or anticlockwise direction, flow will commence and the fluid will pass through the openings in the flow modifying members 7. Due to the shape of these members 7, they will, for any degree of rotation of the vane 1, seat against the valve body. Accordingly the whole of the fluid flow must take place through the openings in these members 7. The amount of fluid flow can be increased from zero (the closed position described above) to a maximum flow when the valve vane 1 is rotated 90° from the closed position.

For a particular degree of rotation of the valve vane 1 the amount of flow and the flow characteristics depend on the number, size and shape of the openings in the flow modifying member 7. If, for instance, it is desired to reduce noise in a pipeline it may be preferred to incorporate a valvevane in the system.

Figure 7:
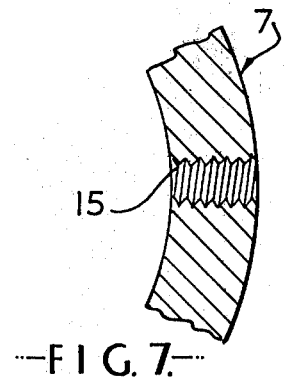
FIG. 7 is a partial cross-section showing a modified opening in the valve vane of FIG. 6.

The space between disc-shaped member 3 and a flow modifying member 7 may be filled or partially filled with suitable silencing material so as to provide a tortuous flow passage for the fluid. Thus, the vane may be cast with flutes, or material such as is used in the silencing system of a motor car may be incorporated. Alternatively or additionally, the cut-out portions (such as the holes 13 (FIG. 6)) may be themselves modified to provide tortuous flow passages. Thus, each hole may be, for instance, filled with suitable silencing material, provided with baffles or a suitable fluted structure, or tapped (15 in FIG. 7) so that a peg having a long, tortuous bore therein may be screwed into the hole.

Figure 4:
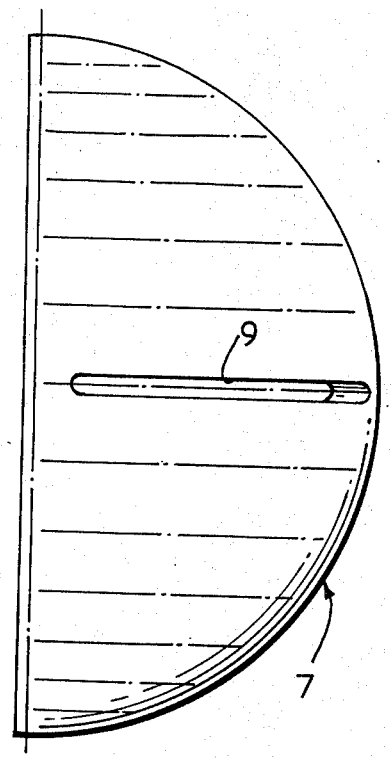
FIGS. 4, 5 and 6 are views of the valve vane shown in FIG. 1 in a direction C showing various possible arrangements for the openings in the flow modifying member.

It should be appreciated that openings of sizes and shapes other than those illustrated in FIGS. 4 to 6 can be provided in the flow modifying members 7. For any specific requirements a particular size, shape and quantity of openings may be preferred and it may be necessary to experiment with a number of arrangements to find that most suitable for a particular requirement.

What we claim is:

1. A vane for a fluid flow control valve having a body, comprising: a disc shaped member mountable for rotation about a first axis in or parallel to the plane of and passing through or near to the center of said disc shaped member, and at least one flow modifying member for seating on the body and depending arcuately and radially inwardly from a peripheral portion of said disc shaped member to at least a second axis perpendicular to and passing through said first axis, said flow modifying member being shaped arcuately to seat against the valve body for any predetermined degree of rotation of said disc shaped member, said flow modifying member having one or more openings therethrough for fluid flow, wherein for any degree of opening of the valve vane, all of the fluid flow is through said one or more openings, and when the valve vane is in a closed position the fluid flow is stopped by said disc shaped member.

2. A valve vane according to claim 1 wherein the flow modifying member depends from a semi-circular portion of the periphery of the disc-shaped member and is in the form of at least a quarter of a spherical shell, the quarter shell being provided with one or more cut-out portions.

3. A valve vane according to claim 2 wherein the vane is provided with a second flow modifying member, both flow modifying members extending in opposite directions from opposed semi-circular portions of the disc-shaped member.

4. A valve vane according to claim 2 wherein the or each cut-out portion is in the form of a slot which lies in a plane at right angles to the axis of rotation of the disc-shaped member.

5. A valve vane according to claim 2 wherein the or each cut-out portion is in the form of a slot which lies in a plane which is parallel to the axis of rotation of the disc-shaped member.

6. A valve vane according to claim 2 wherein the or each cut out portion is in the form of a substantially circular hole.

7. A valve vane according to claim 1 wherein the valve vane is mounted in a valve body to form a flow control valve.

8. A valve vane according to claim 7 wherein the valve is further provided with an actuator to effect movement of the valve vane.

9. A vane for a fluid flow control valve having a body, comprising: a disc shaped member mountable for rotation about a first axis in or parallel to the plane of and passing through or near to the center of said disc shaped member; and, integral with said disc shaped member, two at least quarter shells for seating on the body and extending in opposite directions from opposed semi-circular portions of said disc shaped member, said two quarter shells extending arcuately and radially inwardly at least to a second axis perpendicular to and passing through said first axis, each of said quarter shells having a plurality of cut-out portions for fluid flow, each of said quarter shells being shaped arcuately to seat against the valve for any predetermined degree of rotation of said disc shaped member, wherein for any degree of opening of the valve vane, all of the fluid flow is through one or more of said plurality of cut-out portions, and when the valve vane is in a closed position the fluid flow is stopped by said disc shaped member.

* * * * *